F. F. FORSHEE.
ELECTRIC RANGE HEATING ELEMENT.
APPLICATION FILED MAY 15, 1919.

1,376,415.

Patented May 3, 1921.
2 SHEETS—SHEET 1.

WITNESSES:
Geo. D. Barrett
H. M. Biebel

INVENTOR
Frank F. Forshee.
BY
Wesley G. Carr
ATTORNEY

F. F. FORSHEE.
ELECTRIC RANGE HEATING ELEMENT.
APPLICATION FILED MAY 15, 1919.
1,376,415.
Patented May 3, 1921.
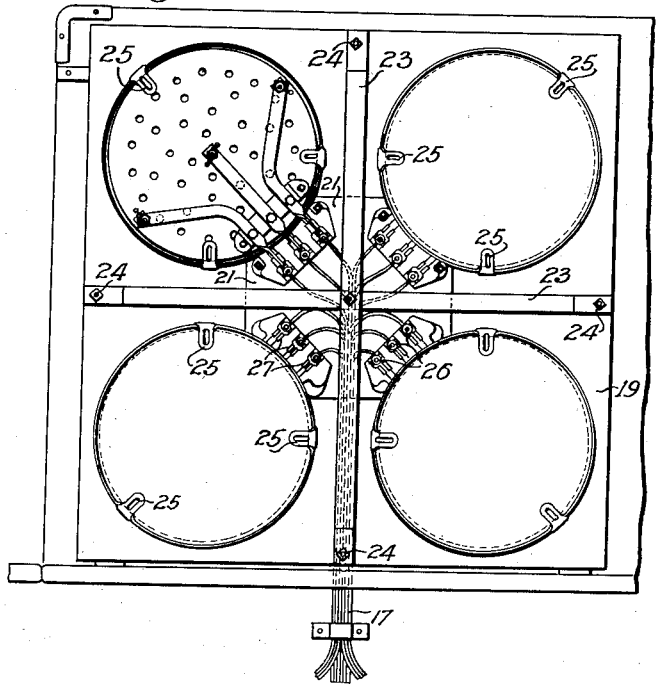
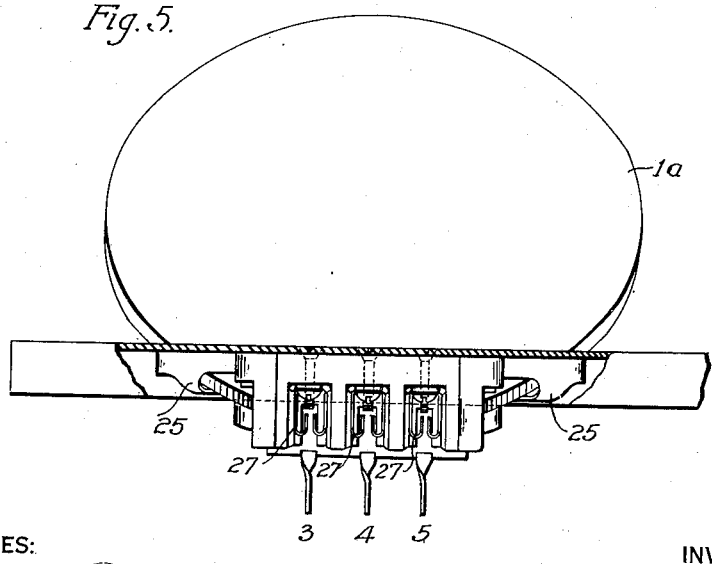
INVENTOR
Frank F. Forshee.

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF MICHIGAN.

ELECTRIC-RANGE HEATING ELEMENT.

1,376,415.  Specification of Letters Patent.  Patented May 3, 1921.

Application filed May 15, 1919. Serial No. 297,359.

*To all whom it may concern:*

Be it known that I, FRANK F. FORSHEE, a citizen of the United States, and a resident of Flint, in the county of Genesee and State of Michigan, have invented a new and useful Improvement in Electric-Range Heating Elements, of which the following is a specification.

My invention relates to electrically-heated ranges and particularly to heating units therefor.

One object of my invention is to provide a heater element with terminal members which shall enable the connection to the supply circuit to be quickly and easily made.

Another object of my invention is to provide a heater of the unit type which may be quickly and easily inserted in place and removed.

Heretofore, heater elements for electric stoves and ranges have usually been made without adequate contact terminals, and the connection of the heating element to the supply circuit was made by means of wires leading from the stove to the element and connected to the resistor by means of bolts and nuts. As these bolts, nuts and wires were of necessity located on the under side of the heater element and of the stove top, it was a tedious and complicated matter to install and to remove such heater element.

In practising my invention, I provide the usual disk heater element with a plurality of terminal bar members located on the under side of the disk, one of the ends of each bar being connected to the resistor and the other ends thereof being grouped relatively close together at one point of the periphery of the disk and extending a short distance beyond the periphery. These bars are preferably of rectangular cross-section and their outer end portions are rigidly clamped to the under side of the disk, although this is not an essential feature of my invention.

Figure 1:
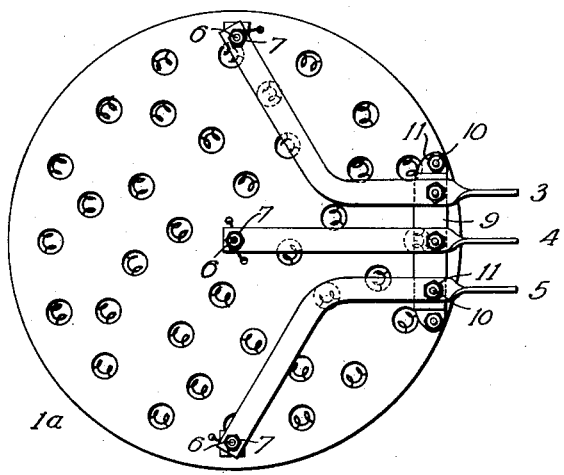
Figure 2:
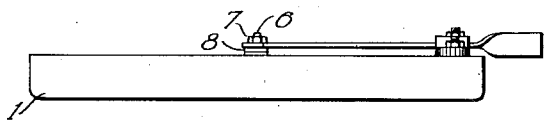
Figure 3:
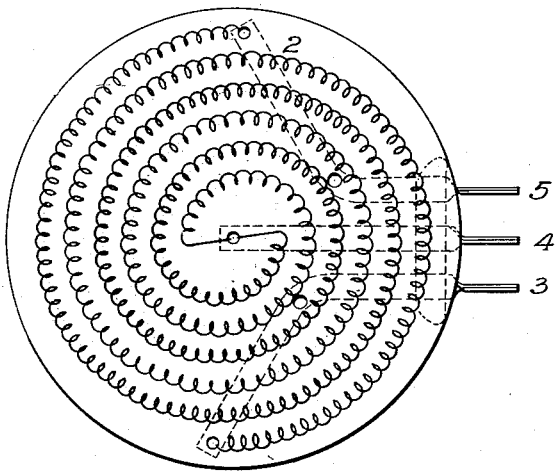

In the drawings, Figure 1 is a bottom plan view of a complete disk-heater element embodying my invention; Fig. 2 is a side elevation thereof, and Fig. 3 is a schematic top view of a heater element showing the arrangement of the resistance element. Fig. 4 is a bottom plan view of a stove top, with one heating element in place, and Fig. 5 is a side view, with part of the stove top shown in section, showing the method of installing the heater.

A heater element, designated at $1^a$, comprises a plate 1 of refractory insulating material and a resistor 2 mounted therein, although my invention is not limited to this design and any suitable construction of resistor and resistor-supporting means may be employed. Terminal bars 3, 4 and 5 of rectangular cross section are connected, respectively, to the two ends of the resistor and to its middle point by means of bolts 6, nuts 7 and spacer washers 8. The bar 4, which is connected to the middle point of the resistor, has its inner end located at the center of the disk and extends radially outward to a small distance beyond the periphery of the disk. The bars 3 and 5, which are connected at one of their respective ends to the ends of the resistor 2 near the periphery of the disk 1, extend toward the bar 4 for a short distance, are then bent and extend parallel to bar 4, projecting beyond the periphery of the disk symmetrically with bar 4. Near the outer ends, the bars 3, 4 and 5 are secured to a suitable spacing bar 9 which, in turn, is suitably secured to the heating element $1^a$.

Fig. 3 shows, schematically, the connections of the terminal bars 3, 4 and 5 to the resistor to enable three degrees of heat to be obtained by the use of suitable switches (not shown) of standard construction.

Fig. 4 is a bottom plan view of a stove top, showing the stationary contact devices and one of the heater elements embodying my invention, placed in the opening provided therefor. A plurality of electric circuits 17, each controlled by a suitable three-heat snap switch (not shown) are connected to three-point terminal blocks 18, located on the under side of a stove top 19, and adjacent to openings 20 therein. The terminal blocks 18 are fastened to a mounting plate 21 which, in turn, is secured to the stove top 19 by means of a bolt 22. A plurality of truss bars 23 are secured to the stove top 19, near the outer edges thereof, by bolts 24, and are held at their middle points by the bolt 22, thus giving the necessary strength to the stove top 19. A plurality of supporting clips 25 are provided in the openings 20 to support the heating element 1ª and any cooking utensil placed thereon during cooking operations. The terminal block 18 is provided with three contact terminals 26 and with corresponding downwardly-projecting switch jaws 27 for coöperating with the terminal bars 3, 4 and 5 to close an electric circuit through the resistor 2.

Fig. 5 shows the method of placing the heater element 1ª in its operative position by first resting the element, face upward, in an inclined position on the two supporting clips 25 adjacent the contact block 18, with the terminal bars 3, 4 and 5 pointing downwardly and below the coöperating switch jaws 27. A downward pressure on the heater element 1ª, at a point opposite the terminal bars 3, 4 and 5, will bring the heater element into its operative position on the supporting clip 25, at the same time causing the terminal bars 3, 4 and 5 to operatively engage the corresponding switch jaws 27.

If it becomes necessary to remove a heater element, a pressure on the upper surface of the heater element 1ª, at a point just above the bar 4 near the edge of the disk, will tilt the disk on two of the clips 25 adjacent the terminal block 18 and cause a downward motion of the disk at that edge, and the terminal bars 3, 4 and 5 will be disengaged from the corresponding switch jaws 27. The outer edge of the disk will be tilted upward above the surface of the stove top and may then be readily removed.

Such a heater element may be completely assembled, as a unit, at the factory and may be inserted in the stove top at any stage of the construction of the stove, and it may be removed from, or replaced in, its operative position by the user without the aid of any tools and with little or no mechanical experience.

While I have shown a disk heater element, my invention is not limited to this form but applies to any form of unitary removable heater element which may be used similarly to the disk heater element described above.

Various modifications may be made in the device without departing from the spirit and scope of the invention, and I desire, therefore, that only such limitations shall be imposed as are indicated by the prior art or are specifically set forth in the appended claims.

I claim as my invention.

1. In a heating element, the combination with a resistor-supporting means, and a resistor located therein, of a plurality of terminal bars connected to said resistor and located in a plane parallel thereto, the outer end portions of said bars being parallel to each other and extending beyond the supporting means and a single means for holding the end portions of said terminal bars against said resistor-supporting means.

2. In an electric stove, the combination with electric supply circuit terminals located in said stove and a removable heater element, of means associated with said heater element for effecting wiping engagement of the heater element and said circuit terminals by tilting the heater element into its operative position in said stove.

3. In an electric stove, the combination with a stove top having an opening therein and stationary contact means mounted on the under side of the stove top adjacent said opening, of a quickly removable heater element adapted to be located in said opening and means associated with the heater element for coöperating with said stationary contact means to connect the heater element to the contact means by tilting the heater element into its operative position in said opening.

4. In an electric stove, the combination with a stove top having an opening therein, of stationary terminal devices mounted on the under side of the stove top adjacent to said opening, a quickly removable heater element adapted to be located in said opening and projecting terminal bars associated with the heater element for effecting wiping engagement of said element and said stationary terminal devices by tilting the heater element into its operative position in said opening.

5. In an electric stove, the combination with a stove top having an opening therein, of a stationary terminal device mounted on the under side of the stove top adjacent to said opening, a quickly removable heater element adapted to be located in said opening, and a plurality of terminal bars projecting beyond the edge of the heater element at one side thereof for effecting wiping engagement of said heating element and said stationary terminal device by tilting the heater element into its operative position in said opening.

6. In an electric stove, the combination with a stove top having an opening therein, of a stationary terminal device mounted on the under side of the stove top adjacent to said opening, a quickly removable heater element adapted to be located in said opening, and a plurality of terminal bars located on the under side of the heater element and projecting beyond the edge at one side thereof for effecting wiping engagement of said element and the stationary terminal device by tilting the heater element into its operative position in said opening.

7. The method of effecting operative engagement of a quickly removable heating element with a stationary contact device in an electric stove, which consists in resting the heating element at its edge on two supporting means in the opening in said stove angularly displaced from its normal position and with the contact bars on said element in line with the stationary contact device and then pressing downwardly on the top of said heating element at one side thereof to bring it into its operative position in said opening.

8. In an electric stove, the combination with a stove top having a plurality of openings therein symmetrically disposed around the transverse central axis of said top, supporting means in said openings and a plurality of stationary contact devices located on the under side of said stove top adjacent to said openings and symmetrically disposed around the transverse central axis of said top, of heater elements adapted to be located in said openings and means associated with each heater element whereby wiping engagement may be effected with the coöperating stationary contact device by tilting said elements into their operative position in said openings.

9. In an electric stove, the combination with a stove top having a plurality of openings therein, supporting means in said openings and a plurality of stationary contact devices located on the under side of said top adjacent to said openings, of heater elements adapted to be located in said openings and means associated with said heater elements whereby wiping engagement is effected with the stationary contact devices by tilting each heater element into its operative position in an opening in said stove top.

In testimony whereof I have hereunto subscribed my name this 23rd day of April, 1919.

FRANK F. FORSHEE.